US012578662B2

(12) United States Patent
Yoshida et al.

(10) Patent No.: US 12,578,662 B2
(45) Date of Patent: Mar. 17, 2026

(54) ELECTROPHOTOGRAPHIC PHOTOSENSITIVE MEMBER, PROCESS CARTRIDGE, AND IMAGE FORMING APPARATUS

(71) Applicant: KYOCERA Document Solutions Inc., Osaka (JP)

(72) Inventors: Yuichi Yoshida, Osaka (JP); Kiichiro Oji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 629 days.

(21) Appl. No.: 18/059,015

(22) Filed: Nov. 28, 2022

(65) Prior Publication Data

US 2023/0168596 A1 Jun. 1, 2023

(30) Foreign Application Priority Data

Nov. 29, 2021 (JP) ................................ 2021-193122

(51) Int. Cl.
*G03G 5/047* (2006.01)
*G03G 5/06* (2006.01)
*G03G 21/18* (2006.01)

(52) U.S. Cl.
CPC ........... *G03G 5/0696* (2013.01); *G03G 5/047* (2013.01); *G03G 21/1814* (2013.01)

(58) Field of Classification Search
None
See application file for complete search history.

(56) References Cited

U.S. PATENT DOCUMENTS

2017/0068178 A1* 3/2017 Azuma ................ G03G 5/0546

FOREIGN PATENT DOCUMENTS

EP 1542083 * 6/2005 ............. G03G 5/147
JP 04-189873 * 7/1992 ......... C09B 67/0026
JP 2003316035 A 11/2003

OTHER PUBLICATIONS

Translation of abstract of JP 04-189873.*

* cited by examiner

*Primary Examiner* — Peter L Vajda
(74) *Attorney, Agent, or Firm* — Studebaker Brackett PLLC

(57) ABSTRACT

An electrophotographic photosensitive member includes a conductive substrate and a photosensitive layer. The photosensitive layer includes a charge generating layer and a charge transport layer. The charge generating layer contains a phthalocyanine pigment and a first resin. A ratio of the mass of the phthalocyanine pigment to the mass of the first resin is greater than 2.0 and less than 3.5. A ratio $A_{830}/A_{783}$ of a second absorbance $A_{830}$ to a first absorbance $A_{783}$ of the charge generating layer is at least 0.97 and no greater than 1.10. The first absorbance $A_{783}$ is an absorbance of the charge generating layer with respect to first light with a wavelength of 783 nm. The second absorbance $A_{830}$ is an absorbance of the charge generating layer with respect to second light with a wavelength of 830 nm.

6 Claims, 4 Drawing Sheets

ELECTROPHOTOGRAPHIC PHOTOSENSITIVE MEMBER, PROCESS CARTRIDGE, AND IMAGE FORMING APPARATUS

INCORPORATION BY REFERENCE

The present application claims priority under 35 U.S.C. § 119 to Japanese Patent Application No. 2021-193122, filed on Nov. 29, 2021. The contents of this application are incorporated herein by reference in their entirety.

BACKGROUND

The present disclosure relates to an electrophotographic photosensitive member, a process cartridge, and an image forming apparatus.

Electrophotographic photosensitive members are used as image bearing members in electrographic image forming apparatuses (e.g., a printer and a multifunction peripheral). In image formation on a recording medium using an image forming apparatus, a charging step, a light exposure step, a development step, a transfer step, and a fixing step are performed, for example. A static elimination step and a cleaning step may be additionally performed as necessary. In the transfer step, transfer bias with a polarity reverse to a charge polarity is applied to an electrophotographic photosensitive member of the image forming apparatus. When charge with a polarity reverse to the polarity of the transfer bias remains on the photosensitive layer of the electrophotographic photosensitive member, an image defect (ghost image) may occur in which an afterimage (ghost) derived from an image formed in previous rotation of the electrophotographic photosensitive member appears.

Recently, a demand for image forming apparatuses that do not include a static eliminator is increasing from the viewpoint of space saving and cost reduction. However, when the static elimination step by a static eliminator is not performed, the charging step is re-performed in a state in which potential difference between an exposed area (corresponding to an image area) and a non-exposed area (corresponding to a non-image area) in the previous rotation remains on the surface of the electrophotographic photosensitive member. As such, a ghost image tends to occur in image formation using an image forming apparatus not including a static eliminator.

In order to inhibit occurrence of a ghost image, an electrophotographic photosensitive member is proposed that includes at least a charge generating layer, a charge transport layer, and a surface protective layer on a conductive substrate. The surface protective layer contains conductive particles and is formed with a curing resin. The charge transport layer contains at least two charge transport materials. A difference between the lowest oxidation potential and the highest oxidation potential of the charge transport materials satisfies a specific formula. With analysis values of the surface of the electrophotographic photosensitive member in X-ray photoelectron spectroscopy, a sum of the ratios of indium and tin contained in the surface protective layer and a sum of ratios of fluorine and silicon contained in the surface protective layer satisfy another specific formula.

SUMMARY

An electrophotographic photosensitive member according to an aspect of the present disclosure includes a conductive substrate and a photosensitive layer. The photosensitive layer includes a charge generating layer and a charge transport layer. The charge generating layer contains a phthalocyanine pigment and a first resin. A ratio of a mass of the phthalocyanine pigment to a mass of the first resin is greater than 2.0 and less than 3.5. A ratio $A_{830}/A_{783}$ of a second absorbance $A_{830}$ to a first absorbance $A_{783}$ of the charge generating layer is at least 0.97 and no greater than 1.10. The first absorbance $A_{783}$ is an absorbance of the charge generating layer with respect to first light with a wavelength of 783 nm. The second absorbance $A_{830}$ is an absorbance of the charge generating layer with respect to second light with a wavelength of 830 nm.

A process cartridge according to another aspect of the present disclosure includes the aforementioned electrophotographic photosensitive member and at least one selected from the group consisting of a charger, a light exposure device, a development device, and a transfer device.

An image forming apparatus according to still another aspect of the present disclosure includes: an image bearing member; a charger that charges a surface of the image bearing member; a light exposure device that exposes the charged surface of the image bearing member to light to form an electrostatic latent image on the surface of the image bearing member; a development device that develops the electrostatic latent image into a toner image by supplying a toner to the surface of the image bearing member; and a transfer device that transfers the toner image from the image bearing member to a transfer target. The image bearing member is the electrophotographic photosensitive member described above.

DETAILED DESCRIPTION

Figure 1:
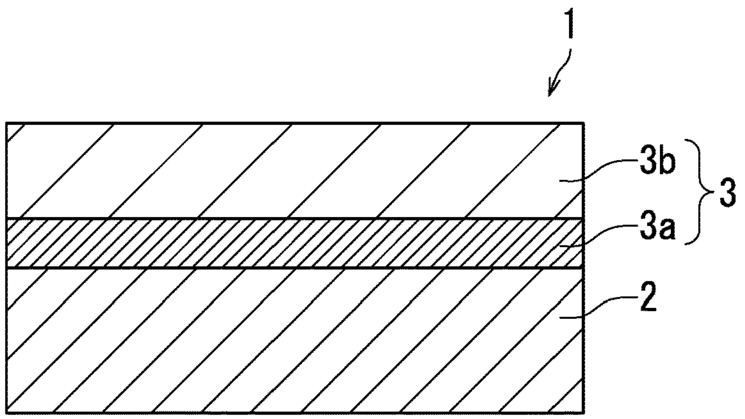
FIG. 1 is a partial cross sectional view of an electrophotographic photosensitive member according to a first embodiment of the present disclosure.

The following described embodiments of the present disclosure in detail. However, the present disclosure is no way limited to the following embodiments and can be practiced within a scope of objects of the present disclosure with alterations made as appropriate.

Terms used in the present specification will be explained first. Viscosity average molecular weight refers to a value as measured in accordance with the Japanese Industrial Standards (JIS) K7252-1:2016 unless otherwise stated. In the following description, the term "-based" may be appended to the name of a chemical compound to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. "General formula" and "chemical formula" may be referred generally to "formula". The phrase "each represent, independently of one another," in description about formulas means possibly representing the same group or different groups. Any one type of each component described in the present specification may be used independently, or two or more types of the component may be used in combination unless otherwise stated.

Substituents used in the present specification will be explained next. An alkyl group with a carbon number of at least 1 and no greater than 6, an alkyl group with a carbon number of at least 1 and no greater than 4, and an alkyl group with a carbon number of 4 each are an unsubstituted straight chain or branched chain alkyl group unless otherwise stated. Examples of the alkyl group with a carbon number of at least 1 and no greater than 6 include a methyl group, an ethyl group, an n-propyl group, an isopropyl group, an n-butyl group, a sec-butyl group, a tert-butyl group, an n-pentyl group, a 1-methylbutyl group, a 2-methylbutyl group, a 3-methylbutyl group, a 1-ethylpropyl group, a 2-ethylpropyl group, a 1,1-dimethylpropyl group, a 1,2-dimethylpropyl group, a 2,2-dimethylpropyl group, an n-hexyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 3,3-dimethylbutyl group, a 1,1,2-trimethylpropyl group, a 1,2,2-trimethylpropyl group, a 1-ethylbutyl group, a 2-ethylbutyl group, and a 3-ethylbutyl group. Examples of the alkyl group with a carbon number of at least 1 and no greater than 4 and the alkyl group with a carbon number of 4 are groups with corresponding carbon numbers among the groups listed as the examples of the alkyl group with a carbon number of at least 1 and no greater than 6.

An alkoxy group with a carbon number of at least 1 and no greater than 6 and an alkoxy group with a carbon number of at least 1 and no greater than 3 each are an unsubstituted straight chain or branched chain alkoxy group unless otherwise stated. Examples of the alkoxy group with a carbon number of at least 1 and no greater than 6 include a methoxy group, an ethoxy group, an n-propoxy group, an isopropoxy group, an n-butoxy group, a sec-butoxy group, a tert-butoxy group, an n-pentoxy group, a 1-methylbutoxy group, a 2-methylbutoxy group, a 3-methylbutoxy group, a 1-ethylpropoxy group, a 2-ethylpropoxy group, a 1,1-dimethylpropoxy group, a 1,2-dimethylpropoxy group, a 2,2-dimethylpropoxy group, an n-hexyloxy group, a 1-methylpentyloxy group, a 2-methylpentyloxy group, a 3-methylpentyloxy group, a 4-methylpentyloxy group, a 1,1-dimethylbutoxy group, a 1,2-dimethylbutoxy group, a 1,3-dimethylbutoxy group, a 2,2-dimethylbutoxy group, a 2,3-dimethylbutoxy group, a 3,3-dimethylbutoxy group, a 1,1,2-trimethylpropoxy group, a 1,2,2-trimethylpropoxy group, a 1-ethylbutoxy group, a 2-ethylbutoxy group, and a 3-ethylbutoxy group. Examples of the alkoxy group with a carbon number of at least 1 and no greater than 3 are groups with corresponding carbon numbers among the groups listed as the examples of the alkoxy group with a carbon number of at least 1 and no greater than 6. The substituents used in the present specification have been explained so far.

First Embodiment: Electrophotographic Photosensitive Member

Figure 2:
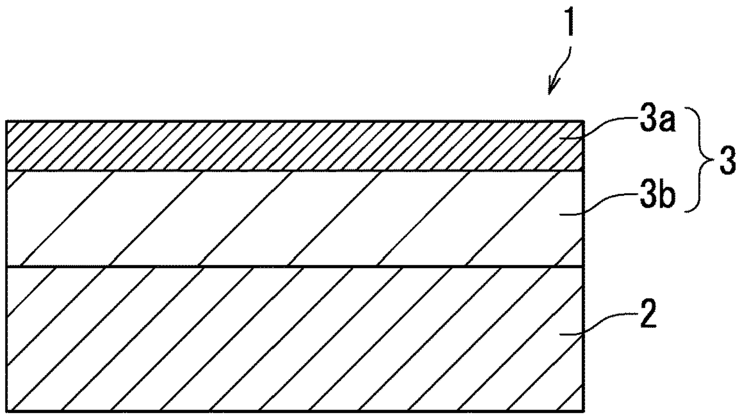
FIG. 2 is a partial cross sectional view of another electrophotographic photosensitive member according to the first embodiment of the present disclosure.
Figure 3:
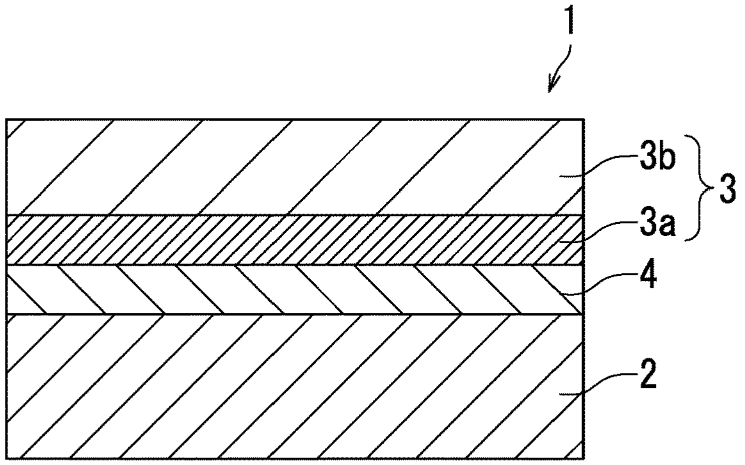
FIG. 3 is a partial cross sectional view of still another electrophotographic photosensitive member according to the first embodiment of the present disclosure.

With reference to FIGS. 1 to 3, an electrophotographic photosensitive member (also referred to below as photosensitive member) 1 according to a first embodiment of the present disclosure will be described below. FIGS. 1 to 3 each are a partial cross-sectional view of the photosensitive member 1 of the first embodiment. The photosensitive member 1 may be called a multi-layer electrophotographic photosensitive member. As illustrated in FIG. 1, the photosensitive member 1 of the first embodiment includes a conductive substrate 2 and a photosensitive layer 3, for example. The photosensitive layer 3 includes a charge generating layer 3*a* and a charge transport layer 3*b*. That is, the photosensitive member 1 includes a charge generating layer 3*a* and a charge transport layer 3*b* as the photosensitive layer 3.

As illustrated in FIG. 1, it is possible that the charge generating layer 3*a* is provided on the conductive substrate 2 and the charge transport layer 3*b* is provided on the charge generating layer 3*a*. Alternatively, it is possible that the charge transport layer 3*b* is provided on the conductive substrate 2 and the charge generating layer 3*a* is provided on the charge transport layer 3*b* as illustrated in FIG. 2.

As illustrated in FIG. 3, the photosensitive member 1 may further include an intermediate layer 4 (undercoat layer) in addition to the conductive substrate 2 and the photosensitive layer 3. The intermediate layer 4 is provided between the conductive substrate 2 and the photosensitive layer 3. In the photosensitive member 1, the photosensitive layer 3 may be provided directly on the conductive substrate 2 as illustrated in FIGS. 1 and 2. Alternatively, the photosensitive layer 3 may be provided on the conductive substrate 2 with the intermediate layer 4 therebetween in the photosensitive member 1 as illustrated in FIG. 3. In a case in which the photosensitive member 1 includes the intermediate layer 4. It is possible that the intermediate layer 4 is provided on the conductive substrate 2, the charge generating layer 3*a* is provided on the intermediate layer 4, and the charge transport layer 3*b* is provided on the charge generating layer 3*a* as illustrated in FIG. 3. Alternatively, it is possible that the intermediate layer 4 is provided on the conductive substrate 2, the charge transport layer 3*b* is provided on the intermediate layer 4, and the charge generating layer 3*a* is provided on the charge transport layer 3*b*.

The photosensitive member 1 may further include a protective layer (not illustrated) in addition to the conductive substrate 2 and the photosensitive layer 3. The protective layer 5 is provided on the photosensitive layer 3. As illustrated in FIGS. 1 to 3, the photosensitive layer 3 (e.g., the charge transport layer 3*b* or the charge generating layer 3*a*) may be provided as an outermost surface layer of the photosensitive member 1. Alternatively, the protective layer may be provided as an outermost surface layer of the photosensitive member 1.

The thickness of the charge generating layer 3*a* is not limited particularly, but is preferably at least 0.01 μm and no greater than 5 μm, and more preferably at least 0.1 μm and no greater than 1 μm. The charge generating layer 3*a* is a single layer, for example. The thickness of the charge transport layer 3*b* is not limited particularly, but is preferably at least 2 μm and no greater than 100 μm, and more preferably at least 10 μm and no greater than 50 μm. The charge transport layer 3*b* is a single layer, for example. The photosensitive member 1 has been described so far with reference to FIGS. 1 to 3. The following further describes the photosensitive member in detail.

<Charge Generating Layer>

The charge generating layer contains a first resin and a phthalocyanine pigment being a charge generating material.

(Ratio $A_{830}/A_{783}$)

A ratio $A_{830}/A_{783}$ of a second absorbance $A_{830}$ to a first absorbance $A_{783}$ of the charge generating layer is at least 0.97 and no greater than 1.10. The first absorbance $A_{783}$ is an absorbance of the charge generating layer with respect to light (first light) with a wavelength of 783 nm. The second absorbance $A_{830}$ is an absorbance of the charge generating layer with respect to light (second light) with a wavelength of 830 nm. In the following, the "ratio $A_{830}/A_{783}$ of the second absorbance $A_{830}$ to the first absorbance $A_{783}$ of the charge generating layer" may be referred to below simply as "ratio $A_{830}/A_{783}$".

The ratio $A_{830}/A_{783}$ serves as an indicator indicating a dispersion state of a phthalocyanine pigment in an application liquid (also referred to below as application liquid for charge generating layer formation) for forming a charge generating layer. In turn, the ratio $A_{830}/A_{783}$ serves as an indicator indicating a dispersion state of the phthalocyanine pigment in a charge generating layer formed with the application liquid for charge generating layer formation.

Figure 4:
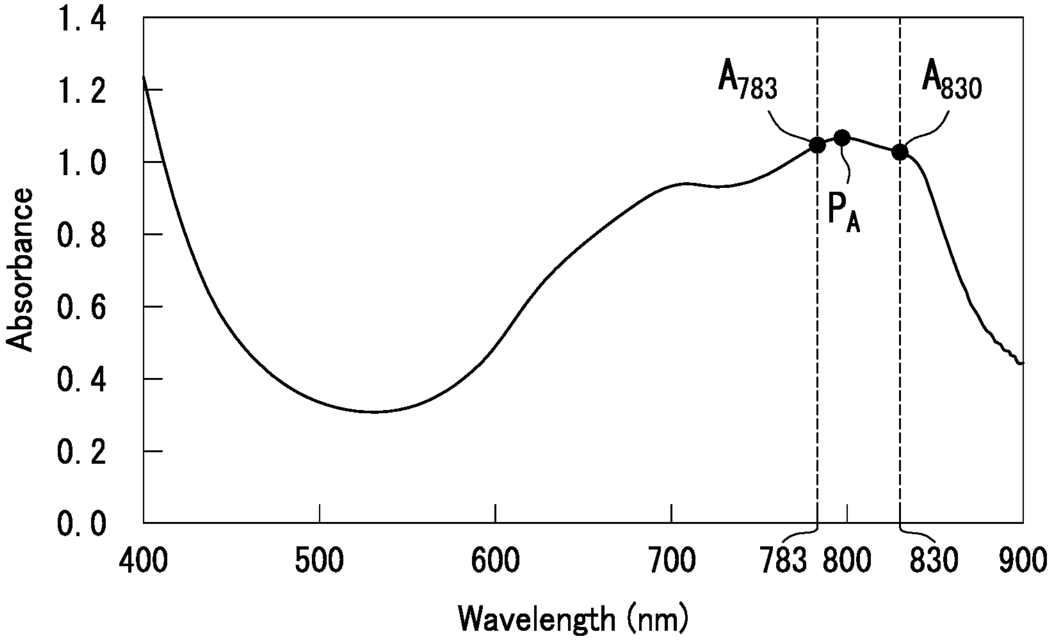
FIG. 4 indicates an absorption spectrum of a charge generating layer of a photosensitive member (A-4) according to Example 4.
Figure 5:
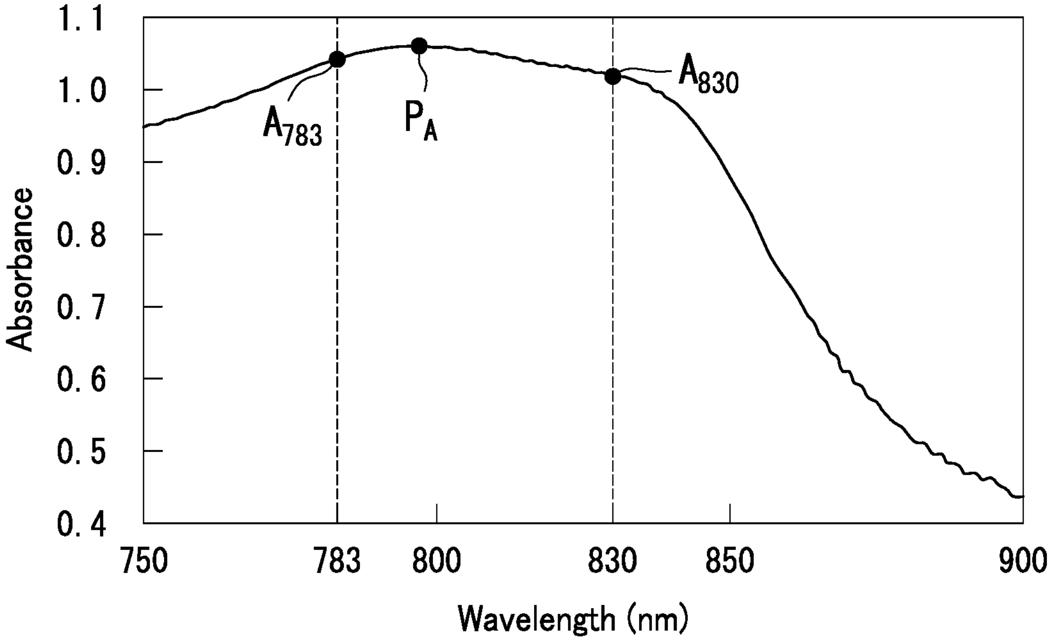
FIG. 5 is an enlarged view of the absorption spectrum in FIG. 4 in a wavelength range between 750 nm and 900 nm.

The ratio $A_{830}/A_{783}$ will be described below with reference to FIGS. 4 and 5. FIG. 4 indicates an absorption spectrum of a charge generating layer of a photosensitive member (A-4) of Example 4 which will be described later. FIG. 5 is an enlarged view of the absorption spectrum of FIG. 4 in a wavelength range between 750 nm and 900 nm. The absorption spectrum is plotted using a spectrophotometer. In FIGS. 4 and 5, the horizontal axis indicates the wavelength (unit: nm) of light while the vertical axis indicates absorbance. In FIGS. 4 and 5, "A783" indicates the first absorbance $A_{783}$ and "A830" indicates the second absorbance $A_{830}$.

As illustrated in FIGS. 4 and 5, the absorption spectrum of the charge generating layer draws a convex curve in a range between 600 nm and 900 nm. The convex curve shows a peak $P_A$ derived from the phthalocyanine pigment contained in the charge generating layer. Note that the peak $P_A$ appears at a wavelength of 797 nm in FIGS. 4 and 5. As dispersion of the phthalocyanine pigment in the application liquid for charge generating layer formation progresses, the peak $P_A$ tends to shift toward the low wavelength side. When the peak $P_A$ shifts toward the low wavelength side, the first absorbance $A_{783}$ increases while the second absorbance $A_{830}$ decreases. As a result, the ratio $A_{830}/A_{783}$ decreases. The lower the ratio $A_{830}/A_{783}$ is, the more dispersion of the phthalocyanine pigment progresses in the application liquid for charge generating layer formation. The lower the ratio $A_{830}/A_{783}$ is, the more sufficiently the phthalocyanine pigment is dispersed in the charge generating layer formed with the application liquid for charge generating layer formation.

The ratio $A_{830}/A_{783}$ being higher than 1.10 means that the phthalocyanine pigment is insufficiently dispersed in the application liquid for charge generating layer formation. When a charge generating layer is formed with such an application liquid for charge generating layer formation, foreign substances (e.g., an agglomerate of the phthalocyanine pigment) is generated in the charge generating layer. When the ratio $A_{830}/A_{783}$ is less than 0.97 by contrast, transfer memory occurs. As such, as a result of the ratio $A_{830}/A_{783}$ being set to at least 0.97 and no greater than 1.10, a photosensitive member can be obtained that includes a charge generating layer with less foreign substances and that inhibits transfer memory. In order to achieve both reduction of foreign substances in the charge generating layer and inhibition of transfer memory in a balanced manner, the ratio $A_{830}/A_{783}$ is preferably at least 0.97 and no greater than 1.05.

The ratio $A_{830}/A_{783}$ can be changed by changing a mixing condition for mixing the phthalocyanine pigment, the first resin, and a solvent in preparation of the application liquid for charge generating layer formation, for example. Examples of the mixing condition include a mixing time and a diameter and a filling rate of a medium of a media type disperser used for mixing. For example, the longer the mixing time is, the lower the ratio $A_{830}/A_{783}$ tends to be.

The ratio $A_{830}/A_{783}$ can be measured by the method described later in Examples, for example. Note that although an application liquid for charge generating layer formation is applied onto a polyethylene terephthalate sheet in Examples, a solution obtained by dissolving a charge generating layer peeled off from a photosensitive member in the solvent may be applied for measurement instead of the application liquid for charge generating layer formation.

(Pigment/Resin Ratio)

A ratio (Mp/Mr) of a mass (Mp) of the phthalocyanine pigment to a mass (Mr) of the first resin is greater than 2.0 and less than 3.5. In the following, the ratio of the mass of the phthalocyanine pigment to the mass of the first resin" may be referred to as "pigment/resin ratio". When the pigment/resin ratio is no greater than 2.0, transfer memory occurs. When the pigment/resin ratio is at least 3.5 by contrast, the phthalocyanine pigment contained in the charge generating layer tends to agglomerate due to its large amount, leading to generation of foreign substances (e.g., an agglomerate of the phthalocyanine pigment) in the charge generating layer. As a result of the pigment/resin ratio being set to greater than 2.0 and less than 3.5, a photosensitive member can be obtained that includes a charge generating layer with less foreign substances and that inhibits transfer memory. In order to achieve both reduction of foreign substances in the charge generating layer and inhibition of transfer memory in a balanced manner, the pigment/resin ratio is preferably at least 2.1 and no greater than 3.3, and more preferably at least 2.3 and no greater than 3.0.

(Phthalocyanine Pigment)

The phthalocyanine pigment is contained in the charge generating layer as a charge generating material. The phthalocyanine pigment is dispersed in the first resin in the charge generating layer, for example. The phthalocyanine pigment is a pigment having a phthalocyanine structure. Examples of the phthalocyanine pigment include metal-free phthalocyanine and metal phthalocyanine. Examples of the metal phthalocyanine include titanyl phthalocyanine, copper phthalocyanine, hydroxygallium phthalocyanine, and chlorogallium phthalocyanine.

The phthalocyanine pigment may be crystalline or non-crystalline. An example of the crystalline metal-free phthalocyanine is metal-free phthalocyanine having an X-form crystal structure (also referred to below as X-form metal-free phthalocyanine). Examples of the crystalline titanyl phthalocyanine include titanyl phthalocyanine having an α-form crystal structure, titanyl phthalocyanine having a β-form crystal structure, and titanyl phthalocyanine having a Y-form crystal structure (also referred to below as α-form titanyl phthalocyanine, β-form titanyl phthalocyanine, and Y-form titanyl phthalocyanine, respectively). An example of the copper phthalocyanine is ε-form copper phthalocyanine.

The phthalocyanine pigment is preferably titanyl phthalocyanine. Titanyl phthalocyanine is represented by formula (CGM-2).

(CGM-2)

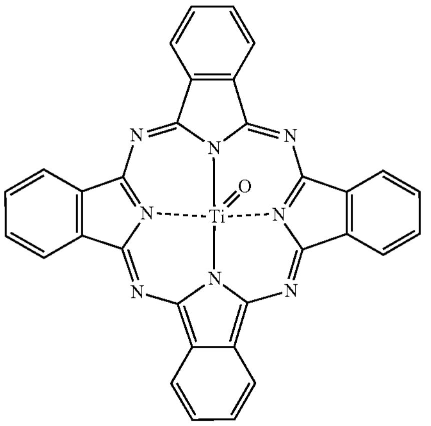

More preferably, the phthalocyanine pigment is Y-form titanyl phthalocyanine. Y-form titanyl phthalocyanine is crystalline titanyl phthalocyanine that exhibits a main peak for example at a Bragg angle $2\theta\pm0.2°$ of 27.2° in a CuKα characteristic X-ray diffraction spectrum. The term main peak refers to a peak that exhibits the most intense or second most intense peak within a range of Bragg angles ($2\theta\pm0.2°$) between 3° and 40° in a CuKα characteristic X-ray diffraction spectrum. Y-form titanyl phthalocyanine exhibits a peak at a Bragg angle 20 f 0.2° of 9.6° rather than 26.2° in the CuKα characteristic X-ray diffraction spectrum.

The CuKα characteristic X-ray diffraction spectrum can be plotted by the following method, for example. First, a sample (titanyl phthalocyanine) is loaded into a sample holder of an X-ray diffractometer (e.g., "RINT (registered Japanese trademark) 1100", product of Rigaku Corporation) and an X-ray diffraction spectrum is plotted under conditions of use of an X-ray tube made from Cu, a tube voltage of 40 kV, a tube current of 30 mA, and a wavelength of the CuKα characteristic X-ray of 1.542 Å. The measurement range ($2\theta$) is for example from 3° to 40° (start angle: 3°, stop angle: 400), and the scanning speed is for example 10°/min. The main peak is determined from the plotted X-ray diffraction spectrum and the Bragg angle of the main peak is read.

Figure 6:
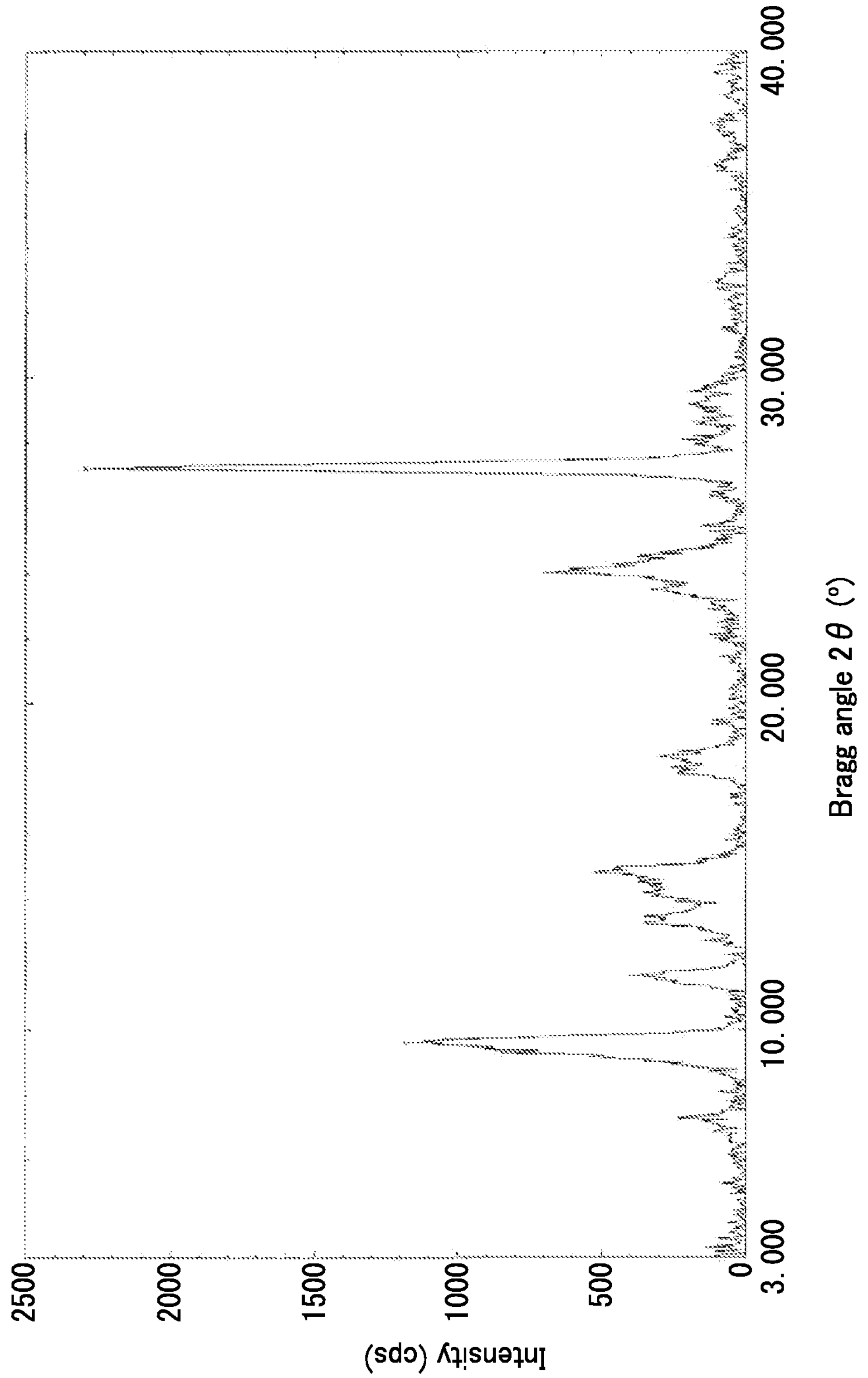
FIG. 6 is a graph representation indicating an example of a CuKα characteristic X-ray diffraction spectrum of titanyl phthalocyanine.

FIG. 6 shows an example of the CuKα characteristic X-ray diffraction spectrum of titanyl phthalocyanine used in the photosensitive member according to the first embodiment. In FIG. 6, the horizontal axis indicates Bragg angle 20 (°) while the vertical axis indicates intensity (cps). From the CuKα characteristic X-ray diffraction spectrum chart of FIG. 6, the measured crystalline titanyl phthalocyanine is determined to be Y-form titanyl phthalocyanine.

(First Resin)

The first resin is a binder resin contained in the charge generating layer. Examples of the first resin include thermoplastic resins (specific examples include polycarbonate resin, polyarylate resin, styrene-based resin, styrene-butadiene copolymers, styrene-acrylonitrile copolymers, styrene-maleate copolymers, styrene-acrylate copolymers, acrylic copolymers, polyethylene resin, ethylene-vinyl acetate copolymers, chlorinated polyethylene resin, polyvinyl chloride resin, polypropylene resin, ionomers, vinyl chloride-vinyl acetate copolymers, polyester resin, alkyd resin, polyamide resin, polyurethane resin, polysulfone resin, diallyl phthalate resin, ketone resin, polyvinyl butyral resin, polyvinyl acetal resin, and polyether resin), thermosetting resins (specific examples include silicone resin, epoxy resin, phenolic resin, urea resin, melamine resin, and other cross-linkable thermosetting resins), and photocurable resins (specific examples include epoxy-acrylic acid-based resin and urethane-acrylic acid-based copolymers). The first resin preferably includes polyvinyl acetal resin or butyral resin, and more preferably include polyvinyl acetal resin.

(Additive)

Each of the charge generating layer, the charge transport layer described later, and the intermediate layer described later may contain an additive as necessary. Examples of the additive include an ultraviolet absorbing agent, an antioxidant, a radical scavenger, a singlet quencher, a softener, a surface modifier, an extender, a thickener, a dispersion stabilizer, a wax, a donor, a surfactant, a plasticizer, a sensitizer, and a leveling agent. The antioxidant is preferably a hindered phenol antioxidant, and more preferably a butylated hydroxytoluene. The leveling agent is preferably silicone oil, and more preferably silicone oil having a dimethylpolysiloxane structure.

<Charge Transport Layer>

The charge transport layer contains a hole transport material and a second resin, for example. Preferably, the charge transport layer further contains an electron acceptor compound.

(Hole Transport Material)

Examples of the hole transport material include a triarylamine derivative, a diamine derivative, an oxadiazole-based compound, a styryl-based compound, a carbazole-based compound, an organic polysilane compound, a pyrazoline-based compound, a hydrazone-based compound, an indole-based compound, an oxazole-based compound, an isoxazole-based compound, a thiazole-based compound, a thiadiazole-based compound, an imidazole-based compound, a pyrazole-based compound, and a triazole-based compound.

A preferably example of the hole transport material is a compound represented by formula (10).

(10)

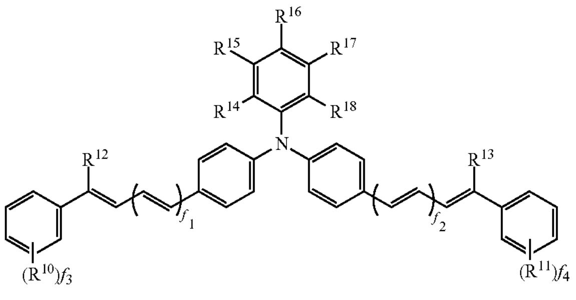

In formula (10), $R^{10}$ and $R^{11}$ each represent, independently of one another, an alkyl group with a carbon number of at least 1 and no greater than 6 or an alkoxy group with a carbon number of at least 1 and no greater than 6. $R^{12}$, $R^{13}$, $R^{14}$, $R^{15}$, $R^{16}$, $R^{17}$, and $R^{18}$ each represent, independently of one another, a hydrogen atom, an alkyl group with a carbon number of at least 1 and no greater than 6, or an alkoxy group with a carbon number of at least 1 and no greater than 6. $f_1$ and $f_2$ each represent, independently of one another, an integer of at least 0 and no greater than 2. $f_3$ and $f_4$ each represent, independently of one another, an integer of at least 0 and no greater than 5.

The alkyl group with a carbon number of at least 1 and no greater than 6 represented by any of $R^{10}$ to $R^{18}$ is preferably an alkyl group with a carbon number of at least 1 and no greater than 4. The alkoxy group with a carbon number of at least 1 and no greater than 6 represented by any of $R^{10}$ to $R^{18}$ is preferably an alkoxy group with a carbon number of at least 1 and no greater than 3, and more preferably an ethoxy group. Preferably, $R^{12}$ to $R^{18}$ each represent, independently of one another, a hydrogen atom or an alkoxy group with a carbon number of at least 1 and no greater than 6. Where $f_3$ represents an integer of at least 2 and no greater than 5, the chemical groups $R^{10}$ may represent the same group as or different groups from one another. Where $f_4$ represents an integer of at least 2 and no greater than 5, the chemical groups $R^{11}$ may represent the same group as or different groups from one another. Preferably, $f_1$ and $f_2$ each represent 1. $f_3$ and $f_4$ each preferably represent, independently of one another, an integer of at least 0 and no greater than 2, and more preferably each represent 0.

An example of the compound represented by formula (10) is a compound (also referred to below as hole transport material (HTM-1)) represented by formula (HTM-1).

(HTM-1)

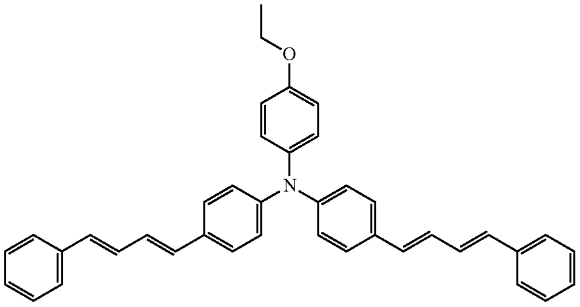

The content ratio of the hole transport material is preferably at least 10 parts by mass and no greater than 200 parts by mass relative to 100 parts by mass of the second resin, and more preferably at least 40 parts by mass and no greater than 80 parts by mass.

(Second Resin)

The second resin is a binder resin contained in the charge transport layer. Examples of the second resin are the same as the aforementioned examples of the first resin contained in the charge generating layer. In order to favorably form the charge transport layer, a resin different from the first resin contained in the charge generating layer is preferably selected from the examples of the second resin as the second resin. The second resin is preferably polycarbonate resin. An example of the polycarbonate resin is a polycarbonate resin including repeating units represented by formulas (20A) and (20B).

(20A)

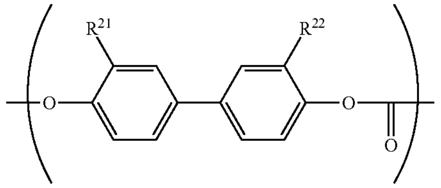

(20B)

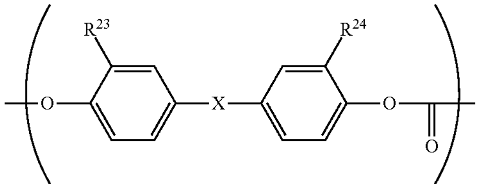

In formula (20A), $R^{21}$ and $R^{22}$ each represent, independently of one another, a hydrogen atom or an alkyl group with a carbon number of at least 1 and no greater than 4. In formula (20B), $R^{23}$ and $R^{24}$ each represent, independently of one another, a hydrogen atom or an alkyl group with a carbon number of at least 1 and no greater than 4. X represents a divalent group represented by formula (X1) or (X2).

(X1)

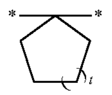

(X2)

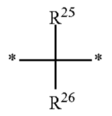

In formula (X1), t represents an integer of at least 1 and no greater than 3 and * represents a bond. In formula (X2), $R^{25}$ and $R^{26}$ each represent, independently of one another, a hydrogen atom or an alkyl group with a carbon number of at least 1 and no greater than 4 and * represents a bond.

The alkyl group with a carbon number of at least 1 and no greater than 4 represented by any of $R^2$ and $R^{22}$ in formula (20A), $R^{23}$ and $R^{24}$ in formula (20B), and $R^{25}$ and $R^{26}$ in formula (X2) is preferably a methyl group or an ethyl group. t in formula (X1) preferably represents an integer of 1 or 2, and more preferably represents 2. The bond represented by * in formulas (X1) and (X2) is bonded to a carbon atom to which X in formula (20B) is bonded.

$R^{21}$ and $R^{22}$ in formula (20A) preferably each represent an alkyl group with a carbon number of at least 1 and no greater than 4, and more preferably each represent a methyl group. $R^{23}$ and $R^{24}$ in general formula (20B) preferably each represent a hydrogen atom. X in formula (20B) preferably represents a divalent group represented by formula (X1). In general formula (X1), t preferably represents 2.

An example of the polycarbonate resin including the repeating units represented by formulas (20A) and (20B) is a polycarbonate (also referred to below as polycarbonate resin (R-1)) represented by formula (R-1). In formula (R-1), the number appended to the lower right corner of each repeating unit represents a mole fraction (unit: mol %) of the corresponding repeating unit with the number appended thereto to the total of the numbers of moles of the repeating units included in the polycarbonate resin (R-1).

(R-1)

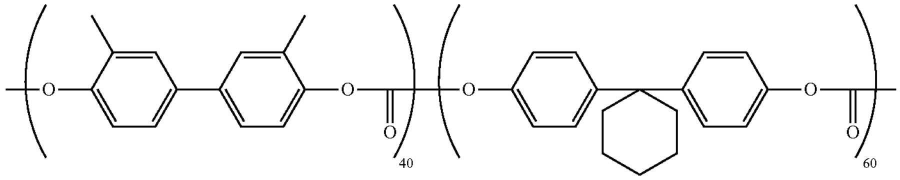

(Electron Acceptor Compound)

Examples of the electron acceptor compound include a quinone-based compound, a diimide-based compound, a hydrazone-based compound, a malononitrile-based compound, a thiopyran-based compound, a trinitrothioxanthone-based compound, a 3,4,5,7-tetranitro-9-fluorenone-based compound, a dinitroanthracene-based compound, a dinitroacridine-based compound, tetracyanoethylene, 2,4,8-trinitrothioxanthone, dinitrobenzene, dinitroacridine, succinic anhydride, maleic anhydride, and dibromomaleic anhydride. Examples of the quinone-based compound include diphenoquinone-based compounds, azaquinone-based compounds, anthraquinone-based compounds, naphthoquinone-based compounds, nitroanthraquinone-based compounds, and dinitroanthraquinone-based compounds.

A preferable example of the electron acceptor compound is a compound represented by formula (30).

(30)

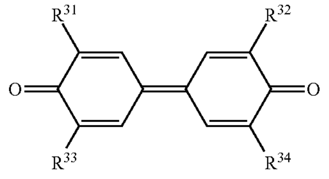

In formula (30), $R^{31}$, $R^{32}$, $R^{33}$, and $R^{34}$ each represent, independently of one another, an alkyl group with a carbon number of at least 1 and no greater than 6.

The alkyl group with a carbon number of at least 1 and no greater than 6 represented by any of $R^{31}$ to $R^{34}$ is preferably an alkyl group with a carbon number of at least 1 and no greater than 4, and more preferably an alkyl group with a carbon number of 4.

An example of the compound represented by formula (30) is a compound (also referred to below as electron acceptor compound (EA-1)) represented by formula (EA-1).

(EA-1)

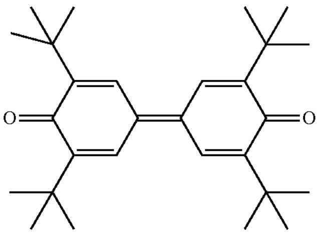

The content ratio of the electron acceptor compound is preferably at least 0.1 parts by mass and no greater than 10 parts by mass relative to 100 parts by mass of the second resin, and more preferably at least 1 part by mass and no greater than 5 parts by mass.

<Intermediate Layer>

The intermediate layer (undercoat layer) contains a resin (intermediate layer resin) used for intermediate layer formation and either or both inorganic particles and organic particles, for example. In the following, the inorganic particles and the organic particles that may be contained in the intermediate layer may be also referred to below collectively as intermediate layer particles. Provision of the intermediate layer can facilitate flow of current generated when the photosensitive member is exposed to light and inhibit increasing resistance, while also maintaining insulation to a sufficient degree so as to inhibit occurrence of leakage current.

Examples of the inorganic particles include white pigments (specific examples include titanium oxide, zinc oxide, zinc white, zinc sulfide, white lead, and lithopone) and extender pigments (specific examples include alumina, calcium carbonate, and barium sulfate). Examples of the organic particles include fluororesin particles, benzoguanamine resin particles, and styrene resin particles. The intermediate layer particles are preferably inorganic particles and more preferably titanium oxide particles. The titanium oxide particles have a number average primary particle diameter of preferably no greater than 100 nm, and more preferably at least 1 nm and no greater than 50 nm. The titanium oxide particles may be surface treated. Surface treatment of the titanium oxide particles may be performed once or multiple times (e.g., twice). Examples of a surface treatment agent used for surface treatment of the titanium oxide particles include alumina, silica, and organosilicon compounds (for example, polysiloxane, and more specifically, methyl hydrogen polysiloxane).

Examples of the intermediate layer resin are the same as the aforementioned examples of the first resin. In order to favorably form the charge generating layer, a resin different from the first resin contained in the charge generating layer is preferably selected from the examples of the intermediate layer resin as the intermediate layer resin. Due to being hygroscopic, polyamide resin is preferable as the intermediate layer resin. A ratio of the mass of the intermediate layer particles to the mass of the intermediate layer resin is preferably at least 1 and less than 4. The intermediate layer preferably has a thickness of at least 0.1 μm and no greater than 5 μm. The intermediate layer particles preferably have a number average particle diameter of at least 1 nm and no greater than 700 nm. The intermediate layer particles preferably have a 50% cumulative diameter ($D_{50}$) of at least 300 nm and no greater than 500 nm in a particle size distribution in terms of volume. The intermediate layer particles preferably have a 90% cumulative diameter ($D_{90}$) of at least 500 nm and no greater than 1000 nm in the particle size distribution in terms of volume.

<Conductive Substrate>

No particular limitations are placed on the conductive substrate, and it is only required that at least a surface portion of the conductive substrate is formed from a conductive material. One example of the conductive substrate is a conductive substrate made from a conductive material. Another example of the conductive substrate is a conductive substrate covered with a conductive material. Examples of the conductive material include aluminum, iron, copper, tin, platinum, silver, vanadium, molybdenum, chromium, cadmium, titanium, nickel, palladium, and indium. A combination of two or more conductive materials may be used as an alloy (specific examples include an aluminum alloy, stainless steel, and brass). Aluminum or an aluminum alloy is preferable as the conductive material in terms of favorable charge mobility from the photosensitive layer to the conductive substrate.

The shape of the conductive substrate is appropriately selected according to the configuration of an image forming apparatus provided with the conductive substrate. The conductive substrate may be sheet-shaped or drum-shaped. The thickness of the conductive substrate is also selected appropriately according to the shape of the conductive substrate.

<Photosensitive Member Production Method>

The following describes an example of a photosensitive member production method. The photosensitive member production method includes charge generating layer formation and charge transport layer formation, for example. In the charge generating layer formation, an application liquid for charge generating layer formation is prepared first. The application liquid for charge generating layer formation is applied onto a conductive substrate. Next, at least a portion of a solvent contained in the applied application liquid for charge generating layer formation is removed to form a charge generating layer. The application liquid for charge generating layer formation contains a first resin, a solvent, and a phthalocyanine pigment being a charge generating material, for example. The application liquid for charge generating layer formation such as above is prepared by dissolving or dispersing the charge generating material and the first resin in the solvent. The application liquid for charge generating layer formation may further contain an additive as necessary. In a case in which an intermediate layer is provided between the conductive substrate and the photosensitive layer, the application liquid for charge generating layer formation is applied onto the intermediate layer provided on the conductive substrate.

In the charge transport layer formation, an application liquid for forming a charge transport layer (also referred to below as an application liquid for charge transport layer formation) is prepared first. The application liquid for charge transport layer formation is applied onto the charge generating layer. Next, at least a portion of a solvent contained in the applied application liquid for charge transport layer formation is removed to form a charge transport layer. The application liquid for charge transport layer formation contains a hole transport material, a second resin, and a solvent. The application liquid for charge transport layer formation is prepared by dissolving or dispersing the hole transport material and the second resin in the solvent. The application liquid for charge transport layer formation may further contain an electron acceptor compound and an additive as necessary.

No particular limitations are placed on the respective solvents contained in the application liquid for charge generating layer formation and the application liquid for charge transport layer formation (each also referred to below simply as application liquid) as long as the solvents can dissolve or disperse components of the respective application liquids. Examples of the solvents include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include methylene chloride, chloroform, ethylene chloride, dichloromethane, dichloroethane, carbon tetrachloride, and chlorobenzene), ethers (specific examples include dioxane, dimethyl ether, diethyl ether, tetrahydrofuran, ethylene glycol dimethyl ether, propylene glycol monomethyl ether, and diethylene glycol dimethyl ether), ketones (specific examples include acetone, methyl ethyl ketone, 2-butanone, and cyclohexanone), esters (specific examples include ethyl acetate and methyl acetate), dimethyl formaldehyde, dimethyl formamide, and dimethyl sulfoxide.

The solvent contained in the application liquid for charge transport layer formation is preferably different from the solvent contained in the application liquid for charge generating layer formation. This is because the charge generating layer will not dissolve in the solvent of the application liquid for charge transport layer formation in application of the application liquid for charge transport layer formation onto the charge generating layer.

The application liquids are each prepared by mixing the corresponding components and dispersing them in the corresponding solvent. Mixing or dispersion can be performed for example using a bead mill, a ball mill, a roll mill, a paint shaker, or an ultrasonic disperser.

Because crystals of a phthalocyanine pigment is hard to be pulverized, a media type disperser capable of performing mixing or dispersion with low shear force is preferably used for mixing or dispersing the application liquid for charge generating layer formation, and a bead mill or a ball mill is more preferably used. Examples of the medium used in the disperser include glass beads, alumina beads, zircon beads, and zirconia beads. Zirconia beads are preferable as the media in the disperser due to their high specific gravity.

No particular limitations are placed on a method for applying the application liquids as long as uniform application can be achieved. Examples of the application method include dip coating, spray coating, bead application, application using a blade, and application using a roller.

The method for removing at least a portion of the solvent contained in either of the application liquids may for example be heating, pressure reduction, or a combination of heating and pressure reduction. More specifically, the method may for example be heat treatment (hot-air drying) using a high-temperature dryer or a reduced pressure dryer. Heat treatment temperature is at least 40° C. and no greater than 150° C. for example. Heat treatment time is at least 3 minutes and no greater than 150 minutes, for example.

Note that the photosensitive member production method may further include either or both intermediate layer formation and protective layer formation as necessary. Any known methods may be selected as appropriate for the intermediate layer formation and the protective layer formation.

Second Embodiment: Image Forming Apparatus

Figure 7:
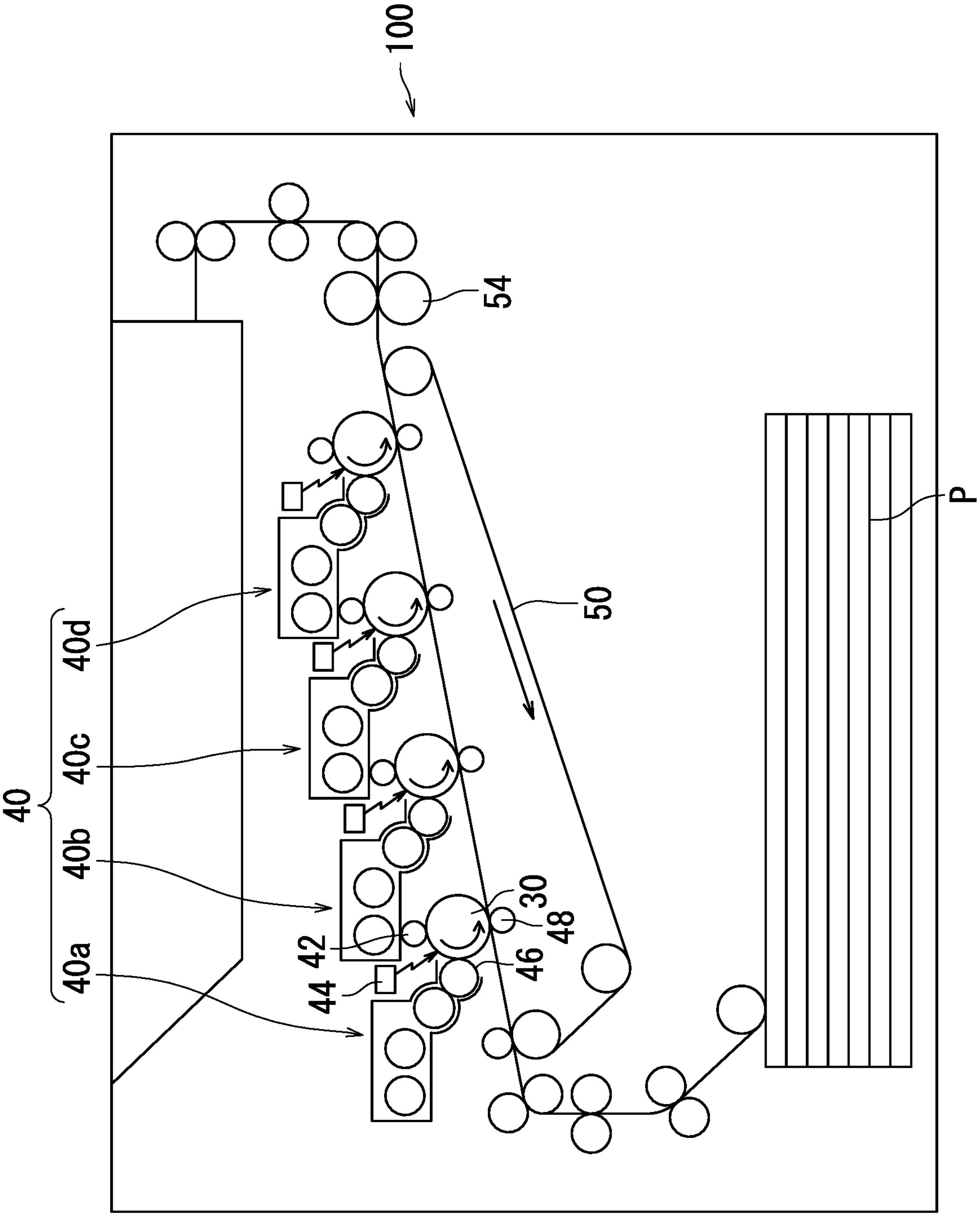
FIG. 7 is a cross sectional view of an image forming apparatus according to a second embodiment of the present disclosure.

The following described an image forming apparatus according to a second embodiment of the present disclosure. In the following, a tandem color image forming apparatus will be described as an example with reference to FIG. 7. FIG. 7 is a cross-sectional view of an image forming apparatus 100 as an example of the image forming apparatus of the second embodiment.

The image forming apparatus 100 illustrated in FIG. 7 includes image forming units 40*a*, 40*b*, 40*c*, and 40*d*, a transfer belt 50, and a fixing device 54. Hereinafter, each of the image forming units 40*a*, 40*b*, 40*c*, and 40*d* is referred to as an image forming unit 40 where it is not necessary to distinguish among the image forming units 40*a*, 40*b*, 40*c*, and 40*d*.

Each image forming unit 40 includes an image bearing member 30, a charger 42, a light exposure device 44, a development device 46, and a transfer device 48. The image bearing member 30 is the photosensitive member 1 of the first embodiment.

As described previously, the photosensitive member 1 of the first embodiment includes the charge generating layer 3*a* with less foreign substances and can inhibit transfer memory. The image forming apparatus 100 accordingly includes the photosensitive member 1 including the charge generating layer 3*a* with less foreign substances as the image bearing member 30. As a result of including the photosensitive member 1 of the first embodiment as the image bearing member 30, the image forming apparatus 100 can inhibit image defects resulting from transfer memory.

The image bearing member 30 is disposed at the central part of the image forming unit 40. The image bearing member 30 is provided so as to be rotatable in a direction (counterclockwise direction) indicated by an arrow in FIG. 7. The charger 42, the light exposure device 44, the development device 46, and the transfer device 48, are disposed around the image bearing member 30 in the stated order from upstream in terms of the rotation direction of the image bearing member 30.

Toner images in different colors (e.g., four colors of black, cyan, magenta, and yellow) are sequentially superimposed on a recording medium P placed on the transfer belt 50 by the image forming units 40*a* to 40*d*.

The charger 42 charges the surface (e.g., the circumferential surface) of the image bearing member 30 to a negative polarity, for example. The charger 42 is a charging roller, for example.

The light exposure device 44 irradiates the charged surface of the image bearing member 30 with exposure light. That is, the light exposure device 44 exposes the charged surface of the image bearing member 30 to light. As a result, an electrostatic latent image is formed on the surface of the image bearing member 30. The electrostatic latent image is formed based on image data input to the image forming apparatus 100.

The development device 46 develops the electrostatic latent image into a toner image by supplying a toner to the surface of the image bearing member 30. The development device 46 (for example, the surface of the development device 46, and more specifically the circumferential surface of the development device 46) is in contact with the surface of the image bearing member 30. That is, the image forming apparatus 100 adopts a contact development process. The development device 46 is a development roller, for example. In a case using a one-component developer as a developer, the development device 46 supplies a toner that is the one-component developer to the electrostatic latent image formed on the image bearing member 30. In a case using a two-component developer as the developer, the development device 46 supplies a toner of the two-component developer containing the toner and a carrier to the electrostatic latent image formed on the image bearing member 30. The image bearing member 30 bears the toner image in the manner described above.

The transfer belt 50 conveys the recording medium P between the image bearing member 30 and the transfer device 48. The transfer belt 50 is an endless belt. The transfer belt 50 is rotatable in a direction (clockwise direction) indicated by an arrow in FIG. 7.

The transfer device 48 transfers the toner image developed by the development device 46 from the surface of the image bearing member 30 to a transfer target. The transfer target is a recording medium P. In toner image transfer, the image bearing member 30 is in contact with the recording medium P. That is, the image forming apparatus 100 adopts a direct transfer process. The transfer device 48 is a transfer roller, for example.

The image bearing member 30 is re-charged by the charger 42 without static elimination performed on an area where the toner image has been transferred to the recording medium P being the transfer target. The image forming apparatus 100 is particularly effective when adopting a system that does not perform static elimination using a static eliminator. This is because transfer memory tends to occur typically in an image forming apparatus that adopts a system that performs static elimination. The image forming apparatus 100 including as the image bearing member 30 the photosensitive member 1 that can inhibit transfer memory can favorably inhibit memory transfer even when adopting the system that does not perform static elimination.

The recording medium P with the toner image transferred thereto by the transfer device 48 is conveyed to the fixing device 54 by the transfer belt 50. The fixing device 54 includes either or both a heating roller and a pressure roller, for example. The unfixed toner image transferred by the transfer device 48 receives either or both heat and pressure by the fixing device 54. As a result of receiving either or both heat and pressure, the toner image is fixed to the recording medium P. As a result, an image is formed on the recording medium P.

Although an example of the image forming apparatus has been described so far, the image forming apparatus is not limited to the above-described image forming apparatus 100. Although the above-described image forming apparatus 100 is a color image forming apparatus, the image forming apparatus may be a monochrome image forming apparatus. In this case, the image forming apparatus may include only one image forming unit, for example. Although the above-described image forming apparatus 100 is a tandem image forming apparatus, the image forming apparatus may be a rotary image forming apparatus, for example. Although the charging roller is exemplified as the charger 42, the charger may be a charger (e.g., a scorotron charger, a charging brush, or a corotron charger) other than the charging roller. Although the above-described image forming apparatus 100 adopts a contact developing process, the image forming apparatus may adopt for example a non-contact developing process. Although the above-described image forming apparatus 100 adopts a direct transfer process, the image forming apparatus may adopt an intermediate transfer process. In a case in which the image forming apparatus adopts an intermediate transfer process, the transfer target corresponds to an intermediate transfer belt. Although the above-described image forming units 40 do not include a cleaning member, each image forming unit may further include a cleaning member (e.g., a cleaning blade). Although the above-described image forming units 40 do not include a static eliminator, each image forming unit may further include a static eliminator.

Third Embodiment: Process Cartridge

The following describes an example of a process cartridge according to a third embodiment of the present disclosure with further reference to FIG. 7. The process cartridge corresponds to each of the image forming units 40*a* to 40*d*. The process cartridge includes an image bearing member 30. The image bearing member 30 is the photosensitive member 1 of the first embodiment. As described previously, the photosensitive member 1 of the first embodiment includes the charge generating layer 3*a* with less foreign substances and can inhibit transfer memory. The process cartridge accordingly includes as the image bearing member 30 the photosensitive member 1 including the charge generating layer 3*a* with less foreign substances. As a result of including the photosensitive member 1 of the first embodiment as the image bearing member 30, the process cartridge can inhibit image defects resulting from transfer memory. The process cartridge further includes at least one selected from the group consisting of a charger 42, a light exposure device 44, a development device 46, and a transfer device 48 in addition to the image bearing member 30. The process cartridge may further include a cleaning member (not illustrated) and a static eliminator (not illustrated). The process cartridge is designed to be freely attachable to and freely detachable from the image forming apparatus 100. In the above configuration, the process cartridge is easy to handle and can therefore be easily and quickly replaced together with the image bearing member 30 when sensitivity or the like of the image bearing member 30 degrade. The process cartridge of the third embodiment has been described so far with reference to FIG. 7.

EXAMPLES

The present disclosure will be described further in detail using examples. However, the present disclosure is by no means limited to the following examples.

Preparation of Application Liquid for Intermediate Layer Formation

A solvent A (mass ratio: methanol/n-butanol/toluene=3/1/1) was obtained by mixing methanol, n-butanol, and toluene. A resin solution B was obtained by dissolving 1 part by mass of polyamide resin ("AMILAN (registered Japanese trademark) CM8000", product of Toray Industries, Inc., quaternary copolyamide resin of polyamide 6, polyamide 12, polyamide 66, and polyamide 610) in 4 parts by mass of the solvent A. An application liquid for intermediate layer formation was obtained by mixing 2.0 parts by mass of titanium oxide ("SMT-A", prototype produced by TAYCA CORPORATION, number average particle diameter 10 nm, titanium oxide obtained through secondary surface treatment using methyl hydrogen polysiloxane on titanium oxide subjected to primary surface treatment using alumina and silica), 0.5 parts by mass of ion exchange water, 5.0 parts by mass of the resin solution B, and 8.0 parts by mass of the solvent A under a condition of a peripheral speed of 8 m/sec. for 6 hours using a circulation type wet disperser ("DYNO (registered Japanese trademark)-MILL", product of Willy A. Bachofen AG).

Preparation of Application Liquid (CG-1) for Charge Generating Layer Formation A solvent C (mass ratio: propylene glycol monomethyl ether/tetrahydrofuran=½) was obtained by mixing propylene glycol monomethyl ether and tetrahydrofuran. A resin solution D was obtained by dissolving 1.0 parts by mass of polyvinyl acetal resin ("S-LEC BX-5", product of SEKISUI CHEMICAL CO., LTD.) in 19.0 parts by mass of the solvent C. Using a media type disperser (bead mill), 2.3 parts by mass of Y-form titanyl phthalocyanine as a charge generating material, 20.0 parts by mass of the resin solution D (amount of polyvinyl acetal resin: 1.0 parts by mass), and 65.0 parts by mass of the solvent C were mixed. The mixing conditions included a peripheral speed of 60 rpm, a mixing time of 4 hours, a filling rate of the medium of the media type disperser of 46.2%, and use of zirconia beads (diameter 0.65 mm) as a medium in the media type disperser. Through the above, an application liquid (CG-1) for charge generating layer formation was obtained. The pigment/resin ratio of the application liquid (CG-1) for charge generating layer formation was 2.3 (=2.3/1.0).

Preparation of Application Liquids (CG-2) to (CG-15) for Charge Generating Layer Formation Application liquids (CG-2) to (CG-15) for charge generating layer formation were each prepared according to the same method as that for preparing the application liquid (CG-1) for charge generating layer formation in all aspects other than that the amount of the added Y-form titanyl phthalocyanine was set so that the corresponding pigment/resin ratio was as shown in Table 1 and the mixing using the media type disperser was carried out for the corresponding mixing time shown in Table 1. Note that the pigment/resin ratio was changed by changing the amount of the added Y-form titanyl phthalocyanine. In preparation of the application liquid (CG-5) for charge generating layer formation, for example, use of 3.0 parts by mass of the Y-form titanyl phthalocyanine yielded an application liquid with a pigment/resin ratio of 3.0 (3.0/1.0).

Preparation of Application Liquid for Charge Transport Layer Formation

A solvent E (mass ratio: toluene/tetrahydrofuran=1/9) was obtained by mixing toluene and tetrahydrofuran. An application liquid for charge transport layer formation was obtained by dissolving 61.00 parts by mass of the hole transport material (HTM-1), 4.00 parts by mass of an antioxidant (butylated hydroxytoluene), 2.00 parts by mass of the electron acceptor compound (EA-1), 0.05 parts by mass of a leveling agent ("KF96-50CS", product of Shin-Etsu Chemical Co., Ltd., dimethyl silicone oil), and 100.00 parts by mass of the polycarbonate resin (R-1) as the second resin in 650.00 parts by mass of the solvent E. The polycarbonate resin (R-1) had a viscosity average molecular weight of 60,000.

Production of Photosensitive Member (A-1)

(Intermediate Layer Formation)

The application liquid for intermediate layer formation was filtered using a filter with an opening of 30 μm. Thereafter, the application liquid for intermediate layer formation after the filtration was applied onto the surface of a conductive substrate by dip coating. The conductive substrate used was a drum-shaped aluminum support (diameter: 30 mm, length: 245.0 mm). Subsequently, heat treatment at 120° C. was carried out on the applied application liquid for intermediate layer formation for 20 minutes to form an intermediate layer (film thickness: 0.5 μm) on the conductive substrate.

(Charge Generating Layer Formation)

The application liquid (CG-1) for charge generating layer formation was filtered using a filter with an opening of 5 μm. The resultant filtrate was applied onto the intermediate layer by dip coating and heat treatment at 90° C. was carried out thereon for 20 minutes. Through the above, a charge generating layer (film thickness: 0.2 μm) was formed on the intermediate layer.

(Charge Transport Layer Formation)

The application liquid for charge transport layer formation was applied onto the charge generating layer by dip coating, heated at a heating rate of 1° C./min. from 60° C. to 125° C., and subsequently heat-treated at 125° C. for 60 minutes in total. Through the above, a charge transport layer (film thickness: 29.5 μm) was formed on the charge generating layer, thereby obtaining a photosensitive member (A-1). In the photosensitive member (A-1), the intermediate layer was provided on the conductive substrate, the charge generating layer was provided on the intermediate layer, and the charge transport layer was provided on the charge generating layer.

<Production of Photosensitive Members (A-2) to (A-6) and (B-1) to (B-9)>

Photosensitive members (A-2) to (A-6) and (B-1) to (B-9) were produced according to the same method as that for producing the photosensitive member (A-1) in all aspects other than use of the application liquids for charge generating layer formation shown in Table 1.

<Measurement of Ratio $A_{830}/A_{783}$>

The application liquid for charge generating layer formation (specifically, any of the application liquids (CG-1) to (CG-15) for charge generating layer formation) was filtered using a filter with an opening of 5 μm to obtain a filtrate. The resultant filtrate was applied by dip coating onto a polyethylene terephthalate sheet (thickness: 0.3 mm) wound around a conductive substrate, and heat treated at 90° C. for 20 minutes. The conductive substrate used in <Production of Photosensitive Member (A-1)> described above was used as the conductive substrate. Through the above, a charge generating layer (film thickness: 0.2 μm) was formed on the polyethylene terephthalate sheet. The polyethylene terephthalate sheet with the charge generating layer formed thereon was taken to be a measurement sample.

With respect to each of the measurement sample and a polyethylene terephthalate sheet with no charge generating layer formed thereon, the absorbance with respect to light with a wavelength of 830 nm and the absorbance with respect to light with a wavelength of 783 nm were measured using a spectrophotometer ("U-3000", product of Hitachi, Ltd.). Thereafter, the absorbance of the measurement sample with respect to the light with a wavelength of 830 nm was amended with the absorbance (baseline) of the polyethylene terephthalate sheet with respect to the light with a wavelength of 830 nm to calculate an absorbance ($A_{830}$) of the charge generating layer with respect to the light with a wavelength of 830 nm. Also, the absorbance of the measurement sample with respect to the light with a wavelength of 783 nm was amended with the absorbance (baseline) of the polyethylene terephthalate sheet with respect to the light with a wavelength of 783 nm to calculate an absorbance ($A_{783}$) of the charge generating layer with respect to the light with a wavelength of 783 nm. Then, a ratio $A_{830}/A_{783}$ of each photosensitive member was calculated using an equation "ratio $A_{830}/A_{783}$=absorbance $A_{830}$/absorbance $A_{783}$". Tables 1 and 2 show the calculated ratios $A_{830}/A_{783}$.

<Evaluation>

With respect to each of the photosensitive members (A-1) to (A-6) and (B-1) to (B-9), application quality, sensitivity, and transfer memory inhibition (evaluation of transfer memory potential difference) were evaluated according to the following methods. Transfer memory inhibition (image evaluation) was evaluated for each of the photosensitive members (A-1) to (A-4), (B-1), and (B-6) among the photosensitive members by the following method.

<Evaluation of Application Quality>

In the production of the photosensitive member, the entirety (except an area with a width of 0.5 mm from one end in the axial direction of the conductive substrate and an area with a width of 0.5 nm from the other end therein) of the surface of the charge generating layer was observed after formation of the charge generating layer and before formation of the charge transport layer to check the presence or absence of a foreign substance with a diameter of at least 0.5 mm. The foreign substance was an agglomerate of the phthalocyanine pigment, for example. Application quality was evaluated according to the following criteria. Table 1 shows evaluation results.

A (good): no foreign substance was observed at all.

B (poor): at least one foreign substance was observed.

<Evaluation of Sensitivity>

Evaluation of sensitivity was carried out in an environment at a temperature of 10° C. and a relative humidity of 15%. The photosensitive member was charged using a drum sensitivity test device (product of GENTEC CO., LTD., static eliminator: none) while being rotated at a rotational speed of 150 rpm so that the surface potential of the photosensitive member was −600V. Next, the surface of the photosensitive member was irradiated with monochromatic light (wavelength: 780 nm, exposure amount; 0.14 μJ/cm$^2$) extracted from light of a halogen lamp using a bandpass filter. The surface potential of the photosensitive member was measured at a time when 70 milliseconds have elapsed from the monochromatic light irradiation, and was taken to be a post-exposure potential ($V_L$, unit: −V). Table 1 shows post-exposure potentials.

<Evaluation of Transfer Memory Inhibition (Evaluation of Transfer Memory Potential Difference)>

Evaluation of transfer memory inhibition was carried out in an environment at a temperature of 23° C. and a relative humidity of 65%. The photosensitive member was charged using a drum sensitivity test device (product of GENTEC CO., LTD., static eliminator: none) while being rotated at a rotational speed of 220 rpm so that the surface potential of the photosensitive member was −600V. Next, the surface of the photosensitive member was irradiated with monochromatic light (wavelength: 780 nm, exposure amount; 0.08 μJ/cm$^2$) extracted from light of a halogen lamp using a bandpass filter while an electric current of +15 μA was allowed to flow to the transfer device of the drum sensitivity test device. The surface potential of the photosensitive member was measured after one rotation of the photosensitive member after the end of the monochromatic light irradiation. The measured surface potential was taken to be 15-μA potential ($V_{L1}$, unit: −V)

Next, charging and monochromatic light irradiation were performed on the photosensitive member according to the same method as that for measuring the 15-μA potential ($V_{L1}$) in all aspects other than change of the electric current flowing to the transfer device from +15 μA to +5 μA. The surface potential of the photosensitive member was measured after two rotations of the photosensitive member after the end of the monochromatic light irradiation. The measured surface potential was taken to be 5-μA potential ($V_L$?, unit: −V)

Using an equation "transfer memory potential difference=(5-μA potential $V_{L2}$)−(15-μA potential $V_{L1}$)", a transfer memory potential difference (unit: V) was calculated. Transfer memory inhibition (transfer memory potential difference) was evaluated according to the following criteria. Table 1 shows transfer memory potential differences and evaluation results.

A (good): transfer memory potential difference of at least −5 V

B (poor): transfer memory potential difference of less than −5 V

<Evaluation of Transfer Memory Inhibition (Image Evaluation)>

Evaluation of transfer memory inhibition (image evaluation) was carried out in an environment at a temperature of 23° C. and a relative humidity of 65%. An evaluation apparatus used for evaluation of transfer memory inhibition (image evaluation) was a modified version of a multifunction peripheral ("BIZHUB c4050i", product of KONICA MINOLTA JAPAN, INC.). The evaluation apparatus was a modified version of a multifunction peripheral including a transfer device of which output setting has been modified. The evaluation apparatus did not include a static eliminator. The photosensitive member was mounted in the evaluation apparatus.

Using the evaluation apparatus, an image I was printed on a sheet of paper to obtain an evaluation image. The image I included an image area and a halftone image area. The image area included a bold letter "G" on a white background located upstream in terms of a recording medium conveyance direction. The halftone image area was located downstream thereof. The halftone image area of the evaluation image was observed with the naked eye to check the presence or absence of an image defect resulting from transfer memory. The image defect resulting from transfer memory refers to an image defect in which a ghost of the letter "G" appears in the halftone image area, for example. Transfer memory inhibition (image evaluation) was evaluated according to the following criteria. Table 2 shows evaluation results.

A (good): no image defect resulting from transfer memory was observed.

B (poor): an image defect resulting from transfer memory was observed.

The terms in Tables 1 and 2 mean as follows. "Application liquid" means an application liquid for charge generating layer formation. "Pigment/resin" means a pigment/resin ratio. "Mixing time" means a time to perform mixing using the media type disperser in preparation of a corresponding application liquid for charge generating layer formation. "$A_{830}/A_{783}$" means a ratio $A_{830}/A_{783}$. "Potential difference" means transfer memory potential difference. "$V_L$" means post-exposure potential of a corresponding photosensitive member in sensitivity evaluation.

TABLE 1

| | Photosensitive member | Application liquid | pigment/resin | Mixing time (hour) | $A_{830}/A_{783}$ | Application quality | Transfer memory Potential difference (V) | Transfer memory Evaluation | Sensitivity $V_L$(−V) |
|---|---|---|---|---|---|---|---|---|---|
| Example 1 | A-1 | CG-1 | 2.3 | 4 | 1.09 | A | −4 | A | 120 |
| Example 2 | A-2 | CG-2 | 2.3 | 10 | 1.03 | A | −3 | A | 134 |
| Example 3 | A-3 | CG-3 | 2.3 | 13 | 1.00 | A | −5 | A | 140 |
| Example 4 | A-4 | CG-4 | 2.3 | 15 | 0.97 | A | −5 | A | 145 |
| Example 5 | A-5 | CG-5 | 3.0 | 10 | 1.04 | A | −1 | A | 134 |
| Example 6 | A-6 | CG-6 | 3.0 | 13 | 1.01 | A | −3 | A | 138 |
| Comparative Example 1 | B-1 | CG-7 | 1.0 | 6 | 1.13 | A | −8 | B | 136 |
| Comparative Example 2 | B-2 | CG-8 | 2.0 | 2 | 1.12 | B | −7 | B | 128 |
| Comparative Example 3 | B-3 | CG-9 | 2.0 | 10 | 1.04 | A | −8 | B | 137 |
| Comparative Example 4 | B-4 | CG-10 | 2.0 | 18 | 0.93 | A | −10 | B | 155 |
| Comparative Example 5 | B-5 | CG-11 | 2.3 | 2 | 1.12 | B | −2 | A | 116 |
| Comparative Example 6 | B-6 | CG-12 | 2.3 | 18 | 0.94 | A | −8 | B | 153 |
| Comparative Example 7 | B-7 | CG-13 | 3.0 | 2 | 1.13 | B | 0 | A | 115 |
| Comparative Example 8 | B-8 | CG-14 | 3.0 | 18 | 0.95 | A | −6 | B | 147 |
| Comparative Example 9 | B-9 | CG-15 | 3.5 | 10 | 1.09 | B | −1 | A | 147 |

TABLE 2

| | Photosensitive member | Pigment/resin | Mixing time (hour) | $A_{830}/A_{783}$ | Transfer memory Image evaluation |
|---|---|---|---|---|---|
| Example 1 | A-1 | 2.3 | 4 | 1.09 | A |
| Example 2 | A-2 | 2.3 | 10 | 1.03 | A |
| Example 3 | A-3 | 2.3 | 13 | 1.00 | A |
| Example 4 | A-4 | 2.3 | 15 | 0.97 | A |
| Comparative Example 1 | B-1 | 1.0 | 6 | 1.13 | B |
| Comparative Example 6 | B-6 | 2.3 | 18 | 0.94 | B |

As shown in Table 1, the photosensitive members (B-1) to (BA) each had a pigment/resin ratio of no greater than 2.0. As a result, transfer memory inhibition (evaluation of transfer memory potential difference) of each of the photosensitive members (B-1) to (B-4) was evaluated as poor. As also shown in Table 2, transfer memory inhibition (image evaluation) of the photosensitive member (B-1) was evaluated as poor.

As shown in Table 1, the photosensitive member (B-9) had a pigment/resin ratio of at least 3.5. As a result, application quality of the photosensitive member (B-9) was evaluated as poor and a foreign substance with a diameter of at least 0.5 mm generated in the charge generating layer thereof.

As shown in Table 1, the photosensitive members (B-5) and (B-7) each had a ratio $A_{830}/A_{783}$ of greater than 1.10. As a result, application quality of each of the photosensitive members (B-5) and (B-7) was evaluated as poor and a foreign substance with a diameter of at least 0.5 mm generated in the charge generating layers thereof.

As shown in Table 1, the photosensitive members (B-6) and (B-8) each had a ratio $A_{830}/A_{783}$ of less than 0.97. As a result, transfer memory inhibition (evaluation of transfer memory potential difference) of each of the photosensitive members (B-6) and (B-8) was evaluated as poor. As also shown in Table 2, transfer memory inhibition (image evaluation) of the photosensitive member (B-6) was evaluated as poor.

By contrast, the photosensitive members (A-1) to (A-6) each had the following features as shown in Table 1. That is, the pigment/resin ratio was greater than 2.0 and less than 3.5. The ratio $A_{830}/A_{783}$ was at least 0.97 and no greater than 1.10. As a result, both application quality and transfer memory inhibition (evaluation of transfer memory potential difference) of each of the photosensitive members (A-1) to (A-6) were evaluated as good. As shown in Table 2, transfer memory inhibition (image evaluation) of each of the photosensitive members (A-1) to (A-4) was also evaluated as good. Note that the absolute value of the post-exposure potential of each of the photosensitive members (A-1) to (A-6) was no greater than 145 V as shown in Table 1 and therefore the photosensitive members (A-1) to (A-6) were evaluated to have sensitivity sufficient for actual use.

It was demonstrated from the above that the photosensitive member of the present disclosure, which encompasses the photosensitive members (A-1) to (A-6), includes a charge generating layer with less foreign substances and can inhibit transfer memory. In addition, as a result of including the photosensitive member such as above, the process cartridge and the image forming apparatus of the present disclosure are determined to include a charge generating layer with less foreign substances and inhibit transfer memory.

What is claimed is:

1. An electrophotographic photosensitive member comprising:

a conductive substrate; and a photosensitive layer, wherein the photosensitive layer includes a charge generating layer and a charge transport layer, the charge generating layer contains a phthalocyanine pigment and a first resin, a ratio of a mass of the phthalocyanine pigment to a mass of the first resin is greater than 2.0 and less than 3.5, and a ratio A830/A783 of a second absorbance A830 to a first absorbance A783 of the charge generating layer is at least 0.97 and no greater than 1.10, the first absorbance A783 being an absorbance of the charge generating layer with respect to first light with a wavelength of 783 nm, the second absorbance A830 being an absorbance of the charge generating layer with respect to second light with a wavelength of 830 nm the charge transport layer contains a hole transport material, a second resin, and an electron acceptor compound, the hole transport material includes a compound represented by formula (10), the second resin includes a polycarbonate resin including repeating units represented by formulas (20A) and (20B), and the electron acceptor compound includes a compound represented by formula (30):

(10)

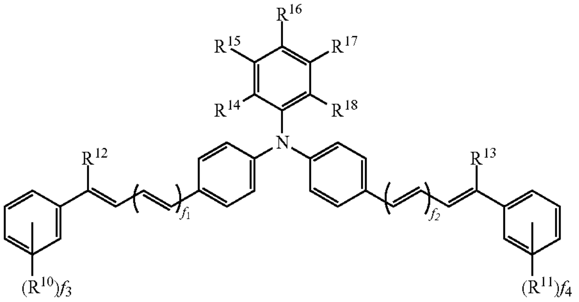

(20A)

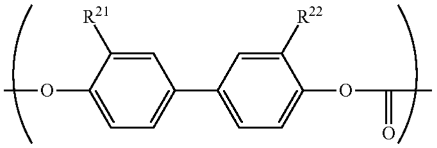

(20B)

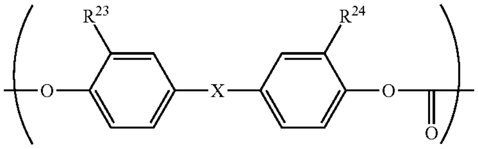

(30)

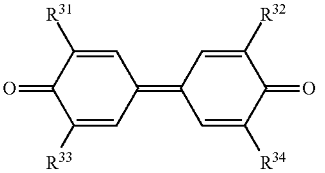

where in the formula (10), R10 and R11 each represent, independently of one another, an alkyl group with a carbon number of at least 1 and no greater than 6 or an alkoxy group with a carbon number of at least 1 and no greater than 6, R12, R13, R14, R15, R16, R17, and R18 each represent, independently of one another, a hydrogen atom, an alkyl group with a carbon number of at least 1 and no greater than 6, or an alkoxy group with a carbon number of at least 1 and no greater than 6, f1 and f2 each represent, independently of one another, an integer of at least 0 and no greater than 2, and f3 and f4 each represent, independently of one another, an integer of at least 0 and no greater than 5, in the formula (20A), R21 and R22 each represent, independently of one another, a hydrogen atom or an alkyl group with a carbon number of at least 1 and no greater than 4, in the formula (20B), R23 and R24 each represent, independently of one another, a hydrogen atom or an alkyl group with a carbon number of at least 1 and no greater than 4, and X represents a divalent group represented by formula (X1) or (X2), and in the formula (30), R31, R32, R33, and R34 each represent, independently of one another, an alkyl group with a carbon number of at least 1 and no greater than 6:

(X1)

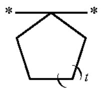

(X2)

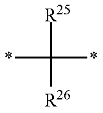

in the formula (X1), t represents an integer of at least 1 and no greater than 3, and represents a bond, and in the formula (X2), R25 and R26 each represent, independently of one another, a hydrogen atom or an alkyl group with a carbon number of at least 1 and no greater than 4, and represents a bond.

2. The electrophotographic photosensitive member according to claim 1, wherein the phthalocyanine pigment is crystalline titanyl phthalocyanine exhibiting a main peak at a Bragg angle 2θ±0.2° of 27.2° in a CuKα characteristic X-ray diffraction spectrum.

3. The electrophotographic photosensitive member according to claim 1, wherein the first resin includes polyvinyl acetal resin.

4. A process cartridge comprising:

at least one selected from the group consisting of a charger, a light exposure device, a development device, and a transfer device; and the electrophotographic photosensitive member according to claim 1.

5. An image forming apparatus comprising:

an image bearing member;

a charger that charges a surface of the image bearing member;

a light exposure device that exposes the charged surface of the image bearing member to light to form an electrostatic latent image on the surface of the image bearing member;

a development device that develops the electrostatic latent image into a toner image by supplying a toner to the surface of the image bearing member; and a transfer device that transfers the toner image from the image bearing member to a transfer target, wherein the image bearing member is the electrophotographic photosensitive member according to claim 1.

6. The image forming apparatus according to claim 5, wherein the image bearing member is re-charged by the charger without static elimination performed on an area where the toner image has been transferred to the transfer target.

* * * * *